United States Patent [19]
Croisant

[11] 3,931,783
[45] Jan. 13, 1976

[54] OIL CIRCULATING SYSTEM FOR MARINE PROPULSION GEAR CASE
[75] Inventor: Elmer E. Croisant, Oshkosh, Wis.
[73] Assignee: Brunswick Corporation, Skokie, Ill.
[22] Filed: Oct. 3, 1973
[21] Appl. No.: 403,317

[52] U.S. Cl............................ 115/34 R; 123/196 W
[51] Int. Cl.². ........................................... B63H 5/12
[58] Field of Search........ 115/17, 34 R; 123/196 W; 184/6.18, 6.12; 308/134.1; 418/194, 195; 74/467

[56] References Cited
UNITED STATES PATENTS

| | | | |
|---|---|---|---|
| 1,446,775 | 2/1923 | Wahl................................. | 184/6.18 |
| 2,607,332 | 8/1952 | Bosma............................. | 123/196 W |
| 2,609,783 | 9/1952 | Kiekhaefer....................... | 115/17 |
| 3,181,494 | 5/1965 | Kiekhaefer et al................ | 115/34 R |
| 3,647,024 | 3/1972 | Wick et al........................ | 123/196 W |

Primary Examiner—Trygve M. Blix
Assistant Examiner—Gregory W. O'Connor
Attorney, Agent, or Firm—Andrus, Sceales, Starke & Sawall

[57] ABSTRACT

A marine propulsion drive mounted to a boat transom includes a vertical drive shaft and a horizontal propeller shaft coupled by a pair of bevel gears in an oil filled lower housing unit. The vertical shaft is supported in vertically spaced bearings, one of which is immediately adjacent the upper wall of the bevel gear and the other of which is spaced upwardly therefrom. A shift member is selectably positioned through a shift linkage including a vertically extending shift rod which projects upwardly through an appropriate opening in the housing. A lateral passageway is provided immediately adjacent the upper bearing which extends laterally and downwardly to the shift passageway. An oil circulating passageway is formed having an inlet end in the upper wall of the lower housing adjacent to the upper face of the drive bevel gear and an outlet end terminating between the bearings. The inlet of the circulating passageway is laterally offset from the common plane through the vertical drive shaft and the propeller shaft and therefore offset with respect to the full mating position of the gear teeth of the corresponding set of bevel gears. The passageway inlet is particularly located overlying the outer peripheral portion of one of the drive gears on the vertical shaft and to the upwardly moving side thereof. The inlet is further located also generally overlying the outermost edge of the mating driven bevel gear on the propeller shaft. Oil flows continuously upwardly through and over the ball bearing unit and returns downwardly through the shift rod opening in the lower unit housing to the lower portion of the gear casing.

9 Claims, 5 Drawing Figures

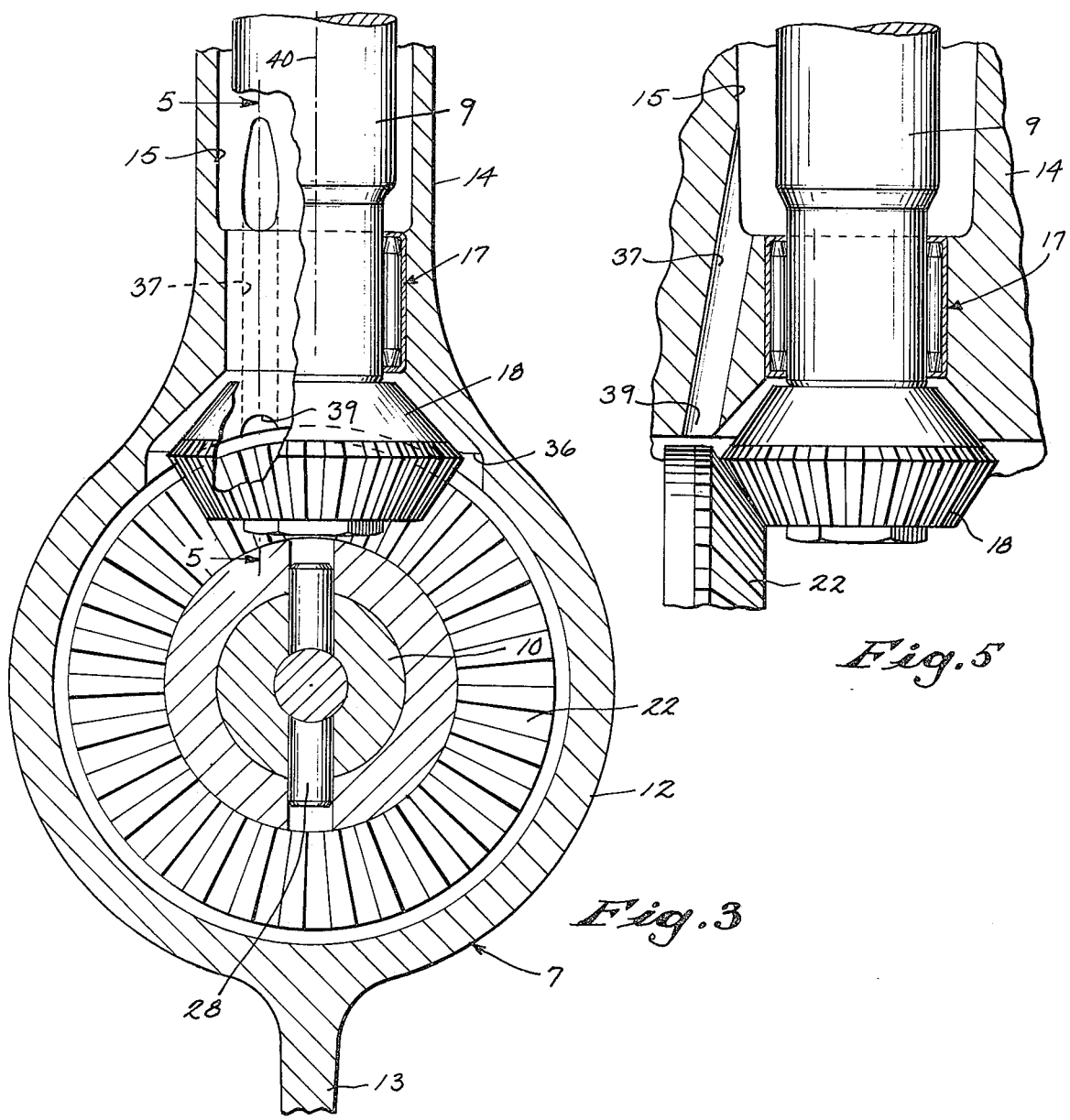
Fig. 3
Fig. 5
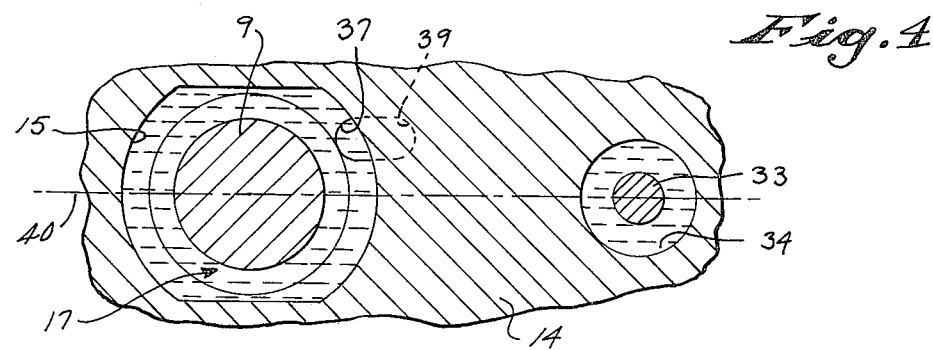
Fig. 4

3,931,783

OIL CIRCULATING SYSTEM FOR MARINE PROPULSION GEAR CASE

BACKGROUND OF THE INVENTION

This invention relates to an oil circulating system for marine propulsion apparatus including a lower gear case unit housing interconnecting drive shaft and propeller shaft gearing, and in particular to an outboard motor including a bevel gear coupling in the lower unit.

Relatively small boats such as recreational power boats widely employ an outboard motor secured to the transom for driving of the boat. More recently inboard-outboard assemblies have been employed for driving of propeller to provide similar propulsion. Generally, in such propeller driven marine propulsion drive systems, a detachable lower unit forms a part of the driving housing of the propulsion apparatus, said unit including a housing closely fitting around a horizontally directed propeller shaft coupled to a vertical drive shaft through suitable coupling gears, generally in the form of bevel gears fixed respectively to the propeller shaft and to the drive shaft. A direct reversing drive can be readily provided by providing a pair of bevel gears rotatably mounted on the propeller shaft and mating with opposite sides of a pinion bevel gear mounted to the lower end of the drive shaft. The opposing faces of the propeller shaft mounted bevel gears are selectively engaged by a drive member fixed to rotate with the propeller shaft. The bevel gears rotate in opposite directions and thus provide a direct reversing drive by selective positioning of the engaging drive member on the propeller shaft.

Generally, the drive shaft is secured within a vertical housing forming a part of the lower unit and most generally integrally formed as a part of the lower gear housing. The shaft is suitably supported by vertically spaced bearings mounted in an opening or chamber in the lower unit housing, which bearings support the drive shaft in driving relationship to the propeller shaft.

It is important to maintain proper lubrication of the gears and the shaft bearing. It is general practice to maintain the gear case totally filled with a suitable lubricating oil to assure adequate lubrication and minimize any entry of water. Further, the lower units are usually formed with some interconnecting passageway between the gear casing portion immediately adjacent the coupling gears and the chamber housing the bearing supports for the drive shaft.

For example, expired U.S. Pat. No. 2,549,477 shows an early lubrication system wherein an inlet oil passage was located adjacent the periphery of the bevel gear on the vertical drive shaft with the centrifugal forces thereof throwing the oil into the passage and thereby causing it to move upwardly and through an interconnecting passageway into the chamber housing the drive shaft bearings. More recently, the inlet passageway has been located immediately above the meshing gears on the common plane through the centers of the vertical shaft and the propeller shaft, relying on the meshing or collapsing of the mating gear teeth to force the oil upwardly through the inlet passageway to the drive shaft chamber, with a suitable return provided to the gear chamber.

Although such systems have provided satisfactory operation, they generally require complete filling of the gear case unit with oil. Further, it has been found desirable to increase the circulation of the oil upwardly through the bearing supports for the drive shaft to maintain optimum lubrication thereof.

SUMMARY OF THE PRESENT INVENTION

The present invention is particularly directed to a marine propulsion drive apparatus including a highly improved liquid lubricant circulating means for continuously circulating the lubricant throughout the gear and bearing portions of the drive system.

Generally, in accordance with the present invention, the drive shaft and the propeller shaft are angularly oriented and coupled by a gear system including gears having beveled mating teeth. The inlet to the circulating passageway is located adjacent such mating surfaces but is particularly offset to the engaging side of the precise common plane through the gear shafts and therefore offset from the position of maximum or full engagement of the gear teeth. Applicant has found that this results in significantly improved circulation of the oil or other lubricant. With the chambers totally filled, as employed in general practice, improved oil circulation is obtained to maintain more efficient and improved operation. However, Applicant has found that even with an oil level as low as the center line of the propeller shaft of such a drive system, sufficient oil circulation may be maintained to properly lubricate all components. All such pumping action, particularly with a filled housing, results in some absorption of the horsepower output of the engine, with an overall slight reduction in the driving horsepower of the motor. With the invention however, the operator may obtain maximum horsepower output without destruction of the lower unit by utilizing a lesser amount of oil, thereby reducing such churning losses. The danger of water entering the lower gear unit would, of course, exist when the unit is not full of oil and special consideration should be given thereto by the operator.

More particularly, in accordance with a preferred construction of the present invention, the drive shaft bevel gear is mounted for rotation generally about a vertical axis on the lower end of the drive shaft. The lower unit includes the horizontally disposed propeller shaft with the spaced bevel gears and the coupling member slidably mounted on the propeller shaft, all enclosed in a housing of minimum size which closely surrounds these elements. The shift member is selectably positioned through a shift linkage including a vertically extending shift rod which projects upwardly through an opening in the housing. The spaced bevel gears are mounted in relatively fixed axial relationship and are in continuous mating with the opposite sides of a drive bevel gear. The drive shaft extends upwardly through the housing and a pair of vertically spaced bearings, one of which is immediately adjacent the upper wall of the bevel gear and the other of which is spaced upwardly therefrom. The spacing between the bearings defines a chamber within the vertical portion of the housing.

The oil circulating path includes a passageway extending from immediately adjacent the upper bearing laterally and downwardly through the shift rod opening. The inlet end of the oil circulating passageway is positioned at a point in the upper wall of the lower unit housing adjacent to the upper face of the drive bevel gear, and is laterally offset from the common plane through the drive shaft and the propeller shaft and therefore offset with respect to the full mating position of the gear teeth of the corresponding set of bevel gears. The inlet is particularly located overlying the outer peripheral portion of the drive gear on the vertical shaft. The inlet is further located over the pocket formed between the engaging drive surfaces of the gear teeth and the point of nearest engagement of the coasting surfaces of the meshing teeth as the teeth moves into mesh. The passageway extends upwardly from the inlet terminating in the wall of the drive shaft chamber immediately adjacent the upper end of the lower drive shaft bearing. The oil is forced as the aforementioned pocket closes, filling the chamber and overflowing through the top drive shaft bearing. The oil flows continuously upwardly through and over the ball bearing unit and returns downwardly through the shift rod opening to the lower portion of the gear casing. Some of the oil will also flow downwardly through the lower drive shaft bearing.

Applicant has found that even if the oil level should drop below the center line of the propeller shaft, the rotation of the driven bevel gear carries the oil upwardly into the area of the drive bevel gear. This centrifugal action and the meshing pumping action described interact, particularly in the offset location, to provide a flow of oil upwardly through the inlet and into the drive shaft bearing chamber. This sysstem thus provides optimum oil circulation primarily as a result of the combination of these two pumping actions.

The present invention provides an improved oil circulation system which can be readily applied to a practical construction similar to that heretofore employed.

BRIEF DESCRIPTION OF THE DRAWINGS

The drawings furnished herewith illustrate the preferred construction of the present invention in which the above advantages and features are clearly disclosed as well as others which will be readily understood from the following description of the illustrated embodiments of the invention.

In the drawings:

FIG. 3 is a cutaway fragmentary enlarged vertical section taken generally on line 3—3 of FIG. 2;

FIG. 4 is a fragmentary horizontal section taken generally on line 4—4 of FIG. 2; and FIG. 5 is a sectional view taken generally on line 5—5 of FIG. 3.

DESCRIPTION OF THE ILLUSTRATED EMBODIMENT

Figure 2:
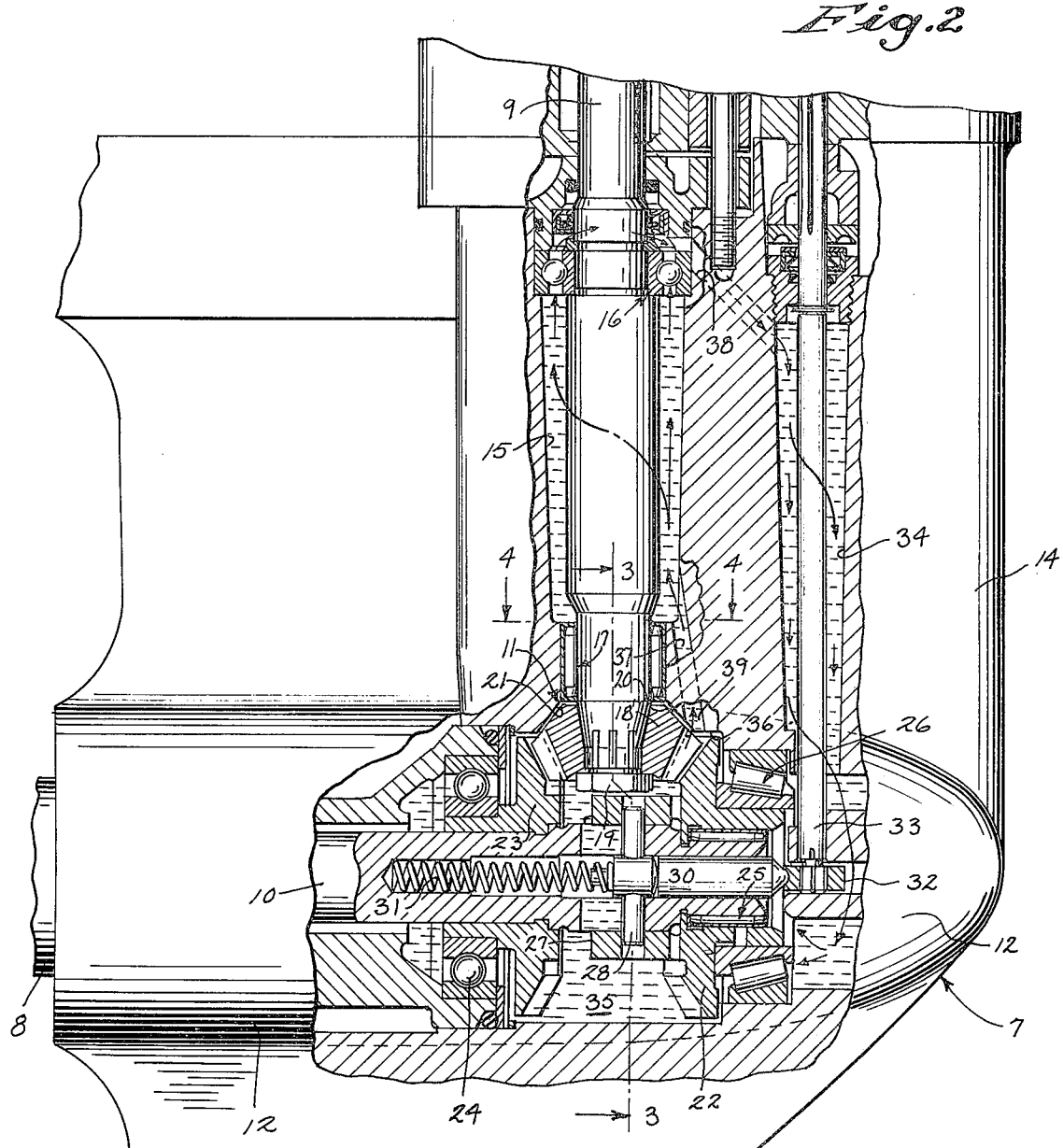
FIG. 2 is an enlarged vertical section through the lower unit of the motor drive assembly generally in the plane of the interconnected drive and propeller shafts.
Figure 1:
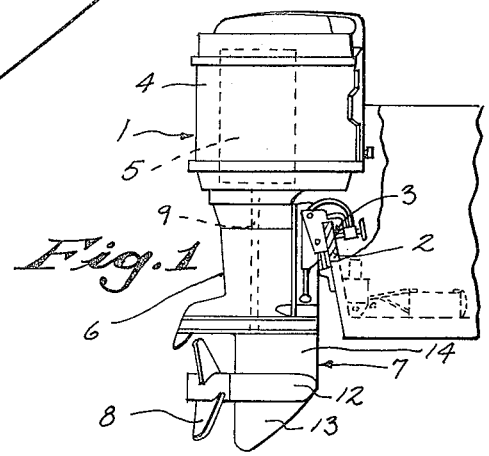
FIG. 1 is a side elevational view of an outboard motor mounted on a boat transom.

Referring to the drawing and particularly to FIG. 1, an outboard motor 1 is illustrated mounted on the transom 2 of a boat, not otherwise shown, through a conventional, well-known clamp and swivel bracket 3. The outboard motor 1 includes an upper power head assembly 4 within which the conventional engine 5 is housed. The power head is mounted on the top of a drive shaft housing 6 with a lower unit or gear housing 7 secured to the lower end thereof and carrying a propeller 8. Thus, the engine 5 in accordance with well-known construction is connectd by a vertical drive shaft 9 which projects downwardly through the drive shaft housing 6. As most clearly shown in FIG. 2, the lower end of shaft 9 terminates within the gear housing 7 and is coupled to the propeller shaft 10, which is mounted essentially normal to the end of the drive shaft, by a suitable bevel gear system 11.

More particularly, the gear housing 7 includes a generally centrally located lower portion 12 which is torpedo shaped and defines a gear chamber within which the propeller shaft 10 and the gear unit 11 are mounted. A depending skeg 13 is provided to protect the propeller against weeds and the like as with conventional construction. The gear housing 7 further includes a streamlined upper body portion 14 which is of a sufficient lateral thickness to accommodate a cored shaft opening 15 through which the vertical drive shaft 9 projects. An upper roller ball bearing 16 and a bottom needle bearing 17 are located to the opposite ends of chamber 15 and rotatably support the lower end of drive shaft 9. The opening 15 is larger than the diameter of the shaft 9 to freely accommodate the shaft and the illustrated bearings. The lower end of the shaft 9 projects into the gear chamber 12 with a bevel gear 18 splined and bolted as by a clamping bolt 19 to the lowermost end of the shaft. The illustrated bevel gear 18 generally has a plurality of bevel teeth formed in the lower half thereof and with the upper half including an oppositely tapered top wall 20. A corresponding recess 21 in the adjaent wall of the chamber 12 lies closely adjacent the top 20 of the bevel gear 18.

The bevel gear 18 meshes with a pair of oppositely located bevel gears 22 and 23 which are rotatably mounted on the propeller shaft 10 within the gear chamber 12. The bevel gears 22 and 23 are essentially correspondingly constructed, with the bevel gear 23 rotatably mounted on shaft 10 to one side of bevel gear 18 by a suitable ball bearing unit 24 and bevel gear 22 rotatably mounted to the forward end of the housing, and to the opposite side of bevel gear 18 by a needle bearing unit 25. Bevel gear 22 is further mounted within the housing by a suitable tapered type bearing unit 26 to support the inner end of shaft 10. The propeller shaft mounted bevel bears 22 and 23 are maintained in constant mesh with the drive bevel gear 18 and rotate in opposite directions. The opposed end faces of bevel gears 22 and 23 are adjapted to be selectively engaged by a drive member 27 which is slidably mounted on the propeller shaft 10 between such gears. Member 27 is rotatably locked to shaft 10 by a locking pin 28 extending through an elongated slot 29 in the propeller shaft 10. The locking pin 28 includes a central portion aligned with a shift pin 30 which is slidably mounted within a central axial recess in shaft 10. A spring 31 within the inner end of the recess urges the pin 28 to a first drive position with pin 30 extended outwardly of the recess and with the outer end thereof slidably engaging a shift cam 32 secured to the lower end of a shift rod 33. Rotation of the shift rod 33 effects corresponding positioning of the pin 30 and shift pin 28 against the bias of the spring 31 for selective positioning of the drive member 27 between a centrally located neutral position and oppositely located drive positions, selectively engaging the corresponding faces of the bevel gears 22 and 23.

The shift rod 33 projects outwardly through a cored opening or chamber 34 in the upper body portion 14, generally parallel to and in lateral alignment with the drive shaft chamber 15. The several chambers 12, 15 and 34 are preferably filled with a liquid lubricant 35 such as a suitable lubricating oil to maintain lubrication of the moving parts and to prevent entrance of water and the like. Further, the walls of chamber 12 are formed to closely conform to the shape of the bevel gears and, in particular, the upper conical or tapered wall 20 merges with a horizontal wall 36 which extends parallel to the adjacent surface of the bevel gear 22 with a small gap therebetween.

The present invention is particularly directed to producing a flow of such oil 35 through the chamber 12 and particularly upwardly through the drive shaft chamber 15, the ball bearing unit 16 and then downwardly through opening 34 returning to the gear chamber 12.

Generally, an inlet passageway 37 is located in the vertical wall of the chamber 15 extending between the upper surface of the bevel gear 22 and the lower portion of the drive shaft chamber 15. A return passageway 38 extends from the upper wall portion immediately adjacent the upper end assembly of the ball bearing unit 16 and downwardly to the upper end of the shift rod opening 34. The latter opening 34 extends downwardly and provides direct communication to the lower end of the gear chamber 12. In accordance with the present invention, the inlet passageway 37 is especially located with respect to the mating bevel gears 18 and 22 to produce an optimum pumping action and thereby establishing a highly improved oil circulation, as follows.

The inlet passageway 37 is shown as a generally rectilinear passageway of cylindrical cross-section. The inlet end 39 is located in the juncture of walls 20 and 36 immediately adjacent to the bevel gears 18 and 22. Furthermore, and more importantly, as shown in FIGS. 3 and 4, the inlet 39 of passageway 37 is laterally offset from a common vertical plane 40 through the axis of bevel pinion gears 18 and the propeller drive bevel gear 22. The inlet opening is thus located in spaced relation to the full or maximum engagement between the teeth of such gears 18 and 22. The amount of offset depends upon the radius of the gears and the coarseness of the gear teeth. The pumping pocket between the teeth forms as the trailing top edge of a drive tooth reaches its point of closest approach to the coasting side of its adjacent driven tooth. Where this occurs with respect to the plane of the drive and propeller gears will depend on the radius of the gears and the size and number of teeth employed. Thus the offset may conceivably vary between 2° and 15°, and should be such that the inlet 39 is located at the point where it will receive the effect of maximum ejection of the oil by the squeezing and centrifugal action of the gears. Speed of rotation of the gears where maximum circulation is desired should also be considered when locating the oil inlet as it will influence the velocity of the oil as it leaves the teeth.

The inlet 39 is further located with respect to the driven gear 22 to the incoming side thereof such that the oil in the lower portion of the chamber 12 which is picked up by the gear 22 is carried upwardly toward the inlet opening. It thus provides a centrifugal action tending to move the oil upwardly of the chamber and thus into the passageway. At this location, the gears 18 and 22 are engaging and force the oil trapped therebetween outwardly by a squeezing action as the teeth move into mesh.

As a result of this offset position, Applicant has found that greater flow results when compared to location of the inlet over the point of maximum engagement of the gears. The action of forcing of the oil from between the gear teeth as well as the centrifugal forces acting on the oil produces the increased pumping action.

The location of the return passageway 38 from immediately above the ball bearing 16 maintains a continuous flow through the bearing 16 with the oil returning, as the result of gravity and pressurization in the drive shaft chamber 15, through the shift shaft opening 34 to the gear chamber 12. The oil within the chamber 15 will also flow as a result of the pressure and gravity directly downwardly through the supporting needle bearing unit 17 located in the lower end of the chamber 15.

Generally, the several chambers of the lower unit 7 will be maintained filled with the lubricating oil 35 to provide oil circulation and to ensure against the entrance of water or the like in accordance with conventional practice. The lubricating effect with the present invention, however, is such that even in the event a significant amount of oil is lost, adequate lubrication will be maintained. Thus, the oil level may drop below the axis of the propeller shaft 10, however, the movement of the remaining oil 35 will maintain sufficient oil circulation to produce the necessary lubrication of the gears and drive shaft bearings 16 and 17.

Further, under this condition of reduced oil level, the amount of power required to transfer the oil is less than that required in the illustration with the chambers completely filled. Thus, it might be desirable under certain cases where speed is considered a prime importance to operate the unit with the reduced amount of oil. Special care must, of course, be taken to prevent the entrance of water which can result in rapid deterioration of the drive system.

Thus, the present invention provides a highly improved and reliable method of circulating oil throughout the lower gear unit of a marine propulsion drive apparatus.

Various modes of carrying out the invention are contemplated as being within the scope of the following claims, particularly pointing out and distinctly claiming the subject matter which is regarded as the invention.

I claim:

1. In a marine propulsion drive apparatus adapted to be secured to a boat with a pendant submerged drive unit including a generally horizontal driven propeller shaft means and an offset generally vertical drive shaft means coupled by relatively fixed drive positioned rotating bevel gear meshes within said unit, said bevel gear means including a pair of meshing bevel gears defining a pocket at the engaging surfaces of the gears, said unit being essentially liquid tight and containing a liquid lubricant, said bevel gear means being in essentially open communication with said liquid lubricant in said unit, an improved lubricant circulating means comprising a circulation passageway means having an inlet means located immediately adjacent the bevel gear means to pick-up forced lubricant from the periphery of the rotating gear means, said inlet means being limited to alignment with said pocket and adjacent to the periphery and offset from the position of maximum bevel gear engagement and located in close spaced relation to the engaging side of the bevel gear means, and a return flow path located in a low pressure area for return flow of the forced lubricant within said unit.

2. The marine propulsion drive apparatus of claim 1 wherein a drive shaft means is rotatably journaled in a shaft chamber means by an upper and a lower bearing means and coupled at the lower end to said propeller drive shaft means by said bevel gear means immediately adjacent the lower bearing means, said passageway means extending upwardly and inwardly to said drive shaft chamber means as an essentially unobstructed passageway, said inlet means being located in alignment with the top portion of said bevel gears and laterally offset from the common axial plane through the bevel gears to the upwardly moving side of the bevel gears on said propeller shaft means, said return passageway means extending from the upper bearing means downwardly for gravity return of the forced lubricant to the bevel gear means.

3. The drive apparatus of claim 2 wherein a pair of spaced oppositely facing driven bevel gears are rotatably mounted on the propeller shaft means and said drive shaft means has a drive bevel gear mating with and oppositely and continuously rotating said driven bevel gears, shift means selectively coupling said propeller shaft means to said driven gears, and said inlet opening means being located adjacent one of the driven gears and the drive gear.

4. The drive apparatus of claim 1 wherein said drive unit includes a lower gear housing with said propeller shaft rotatably mounted therein and having an integral drive shaft housing extending perpendicularly therefrom, said drive shaft extending through said drive shaft housing and having a pair of spaced bearing units, said bevel gears including a drive bevel gear secured to said drive shaft and a driven bevel gear secured to said propeller shaft, said passageway inlet means being formed in said drive shaft housing wall immediately above the drive bevel gear and the driven bevel gear to the leading side of the driven bevel gear and extending upwardly and inwardly to said drive shaft chamber between said spaced bearing units.

5. The drive apparatus of claim 4 wherein said gear housing and said shaft housing are sealed to retain the lubricant and prevent entrance of water.

6. The drive apparatus of claim 4 wherein said drive shaft housing includes a return passageway means from the upper bearing means downwardly to the lower gear housing for return of the forced lubricant.

7. The drive apparatus of claim 6 wherein a pair of spaced oppositely facing driven bevel gears are rotatably mounted on the propeller shaft within said gear housing, said drive bevel gear on said drive shaft mates with and oppositely rotates said driven bevel gears, shift means selectively couples said propeller shaft to said driven gears, said shift means including an operator projecting upwardly through the return passageway means from said upper bearing means.

8. The drive apparatus of claim 5 wherein said inlet means extends upwardly and inwardly to said drive shaft chamber as an essentially straight unobstructed passageway.

9. The drive apparatus of claim 1 wherein said driven unit includes a generally L-shaped housing including a lower gear chamber means and an upwardly extending drive shaft chamber means, said propeller shaft means being rotatably mounted in said gear chamber and having a pair of spaced oppositely facing driven bevel gears rotatably mounted on the shaft, said drive shaft being journaled in the drive shaft chamber and having a drive bevel gear mating with and oppositely rotating said driven bevel gears, said housing having a shift operator opening extending parallel to the drive shaft chamber, shift means extending through said operator opening selectively coupling said propeller shaft means to said driven gears, said gear chamber having an inner wall essentially conforming to the bevel gears and slightly spaced therefrom, said inlet means being an inlet passageway extending from the upper wall of the gear chamber through the wall of said drive shaft chamber as an essentially straight unobstructed passageway, said inlet passageway having an opening located in alignment with one of said driven bevel gears and the drive gear laterally offset from the common axial plane through the bevel gears and generally overlying the upwardly moving face of the driven gear, a return passageway means immediately above the upper bearing means to operator opening for gravity return of the forced lubricant downwardly to below the level of the propeller shaft.

* * * * *

UNITED STATES PATENT AND TRADEMARK OFFICE
CERTIFICATE OF CORRECTION

PATENT NO. : 3,931,783
DATED : JANUARY 13, 1976
INVENTOR(S) : ELMER E. CROISANT

It is certified that error appears in the above-identified patent and that said Letters Patent are hereby corrected as shown below:

Column 1, Line 17, at the end of the line cancel "driving" and insert --- drive ---;

Column 3, Line 6, at the end of the line cancel "moves" and insert --- move ---;

Column 4, Line 42, after "are" cancel "adjapted" and insert --- adapted ---;

Column 5, Line 34, after "pinion" cancel "gears" and insert --- gear ---;

Column 6, Line 46, after "gear" cancel "meshes" and insert --- means ---;

Column 7, Line 3, after "essentially" insert --- straight ---;

Column 8, Line 10, cancel "5" and insert --- 4 ---;

Signed and Sealed this first Day of June 1976

[SEAL]

Attest:

RUTH C. MASON
Attesting Officer

C. MARSHALL DANN
Commissioner of Patents and Trademarks